United States Patent Office 3,211,089
Patented Oct. 12, 1965

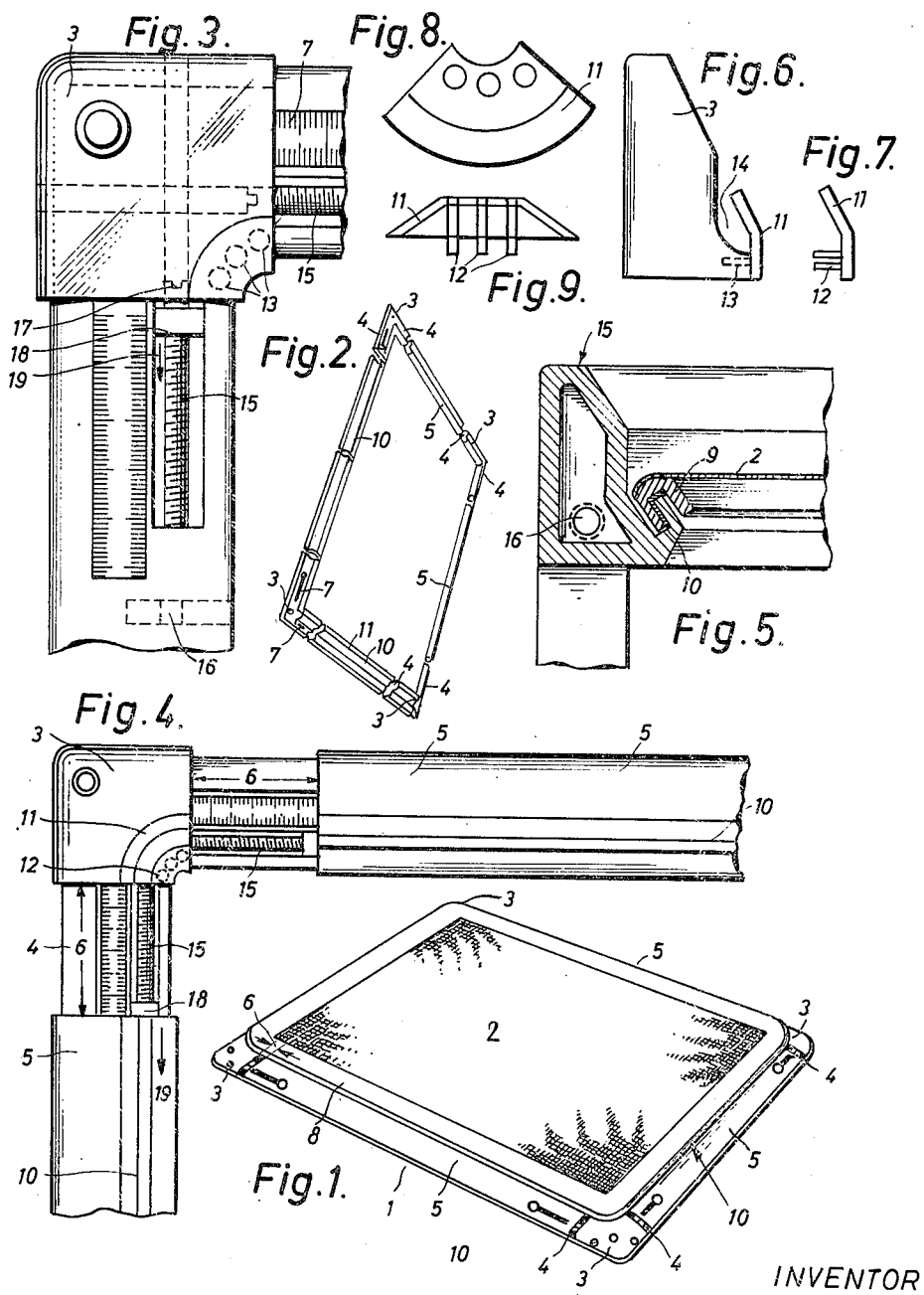

3,211,089
SCREEN PRINTING SCREEN
Elmar Messerschmitt, Kreittmayrstrasse 8,
Munich, Germany
Filed Jan. 15, 1962, Ser. No. 166,148
Claims priority, application Germany, July 15, 1961,
M 49,896
6 Claims. (Cl. 101—127.1)

The invention relates to a screen printing screen comprising a tenter frame which, by enlarging its periphery, stretches the netting of the screen, which netting is provided with a border.

The purpose of the invention is to construct the tenter frame and the border of the screen netting so as to make it possible both to produce screen printing screens cheaply and to stretch even the finest screens evenly and quickly. The border is releasably connected to the tenter frame.

It is known to use tenter frames on which the screen netting is stretched over a border. The disadvantages of constructions where the border is made of snythetic plastics material is that stretching is difficult in the corners of the frame as the plastics sections warp and it is also difficult to join the screen netting to the border so that the tensioning forces produced by the tenter frame are evenly distributed over the whole of the screen netting.

The invention aims at avoiding these disadvantages and at constructing the tenter frame and the border of the screen netting so that the netting can be easily fixed on the frame and so that variable controlled tension can be obtained in the netting.

According to the present invention the complementary sections provided for the border and extending round the frame take the form of arcuate sections at the corners of the frame, which sections are releasably attached to the frame, and the border includes plastics sections welded to the screen netting.

The purpose of the invention is achieved by combining these features. The arcuate sections at the corners of the frame can be previously introduced into the border formed by the plastics sections and then connected to the corners of the frame, for example by slipping on. This excludes the possibility of the plastics sections being distorted during the stretching process. If these arcuate sections are previously rigidly connected to the corners of the frame they have protruding portions into which the border sections are pressed in the manner of a press fastener. With this construction it is possible to stretch the screen netting evenly by enlarging the periphery of the tenter frame.

It is essential for the screen netting to be welded to the plastics sections and not stuck as is customary.

This welding ensures that the tensional force is evenly transferred even to the thinnest threads of the screen netting, thus making it possible to stretch screen netting with a mesh aperture much smaller than is customary. Such fine netting could not in fact be used hitherto, as it was difficult to fasten evenly in the border all the threads making up the netting.

It is desirable for the cross-section of the border sections and the complementary sections of the frame to be U-shaped.

In order to ensure good stretching, it is important for the complementary sections of the border to be arranged on hollow shank members which guide guide members rigidly connected to the corners of the frame and press these apart through a screw drive during the stretching process.

As far as the construction of the corners of the frame is concerned, it is possible to provide bores therein, into which are fastened the arcuate corner sections which are provided with pins and form a U-section.

The amount of tension is determined through providing the guide members with scales.

A desirable construction for stretching consists in providing the corners with threaded bores, in which are mounted pins which bear on the shank members during stretching.

Examples of the invention are illustrated in the accompanying drawings. Further features of the invention will become apparent from the drawings and the related description. In the drawings:

FIG. 1 is a perspective view of the tenter frame with the screen netting stretched across it;

FIG. 2 is a perspective view of the tenter frame shown in FIG. 1 with the screen netting removed;

FIG. 3 shows details of a corner of the frame with the guide members rigidly connected thereto and arranged at right angles to each other, and the fastening bores provided in the corner of the frame for the arcuate section;

FIG. 4 is the corner of the frame shown in FIG. 3, with hollow shank members pushed up on both sides onto the guide members, and with the arcuate section member fitted on the corner of the frame;

FIG. 5 shows details of a cross-section through a hollow shank member with the complementary section engaged by the border section, the screen netting being joined to the border section by welding;

FIG. 6 gives diagrammatic details of the corner of the frame fitted with the arcuate section member which forms the complementary section into which the corner section of the border will be inserted;

FIG. 7 is a diagram of the sectional member of FIG. 6 shown by itself;

FIG. 8 is a plan view of the arc-shaped sectional member shown in FIG. 7, and

FIG. 9 is an end elevation of FIG. 8.

FIG. 1 shows the tenter frame 1 onto which the screen netting 2 is fastened. The frame has corners 3 which are rigidly connected to guide members 4 (FIG. 4). These guide members receive hollow shank members 5, so that the tenter frame comprises eight separate parts. When the shank members 5 are pressed away from the corner members 3 by means of a screw drive, shown more clearly in FIGS. 3 and 5, then the space 6 between the shank members and the corner members is enlarged. In this way the periphery of the frame is enlarged and the screen netting 2 is stretched. The size of the space 6 can be read off scales 7. The screen netting 2 is welded onto a profiled plastics section forming the border 8. It is desirable for this plastics section 9 to be U-shaped in cross-section, as shown in FIG. 5. The screen netting 2 is welded onto the plastics section at the web of the U-section. The synthetic plastics material used must accordingly be thermoplastic.

The complementary section 10 provided on the shank members 5 to receive the section 9 of the border, is present only along the length of the shank members 5. Arcuate section members 11 are placed on the corners of the frame. In the example shown these section members are connected to the corner 3 of the frame by a plurality of pins 12. The pins 12 engage bores 13 arranged in the corner 3.

It will be appreciated that these corners make it possible to transfer an even tension to the screen netting and its border respectively, even if the space 6 varies considerably. Since difficulties are often encountered in fixing the plastics sections to the complementary sections 10, the loose sectional members 11 can first be pushed into the corners of the plastics borders and then connected to the tentering frame 1 by inserting the pins 12 in the bores 13. On subsequent stretching the sections 9 are locked automatically to the complementary sections 10.

It can be seen from FIGS. 6 and 7 that the arcuate section members 11 have an angled portion, so that a space 14 is left beween the corner 3 of the frame and the section member 11. This space 14 matches the complementary sections 10.

The stretching process can be seen by comparing FIGS. 3 and 4. A screw drive 15 engages a female thread 16 arranged in the shank members 5. When the screw head 17, connected to the screw thread 15, is turned, for example by means of screw keys, then nut 18 is moved, for example in the direction of the arrow 19, until it bears on the shank member 5. Further moving of this nut 18 in the direction 19 enlarges the space 6 between the shank member 5 and the corner 3 of the frame, and this enlargement of the periphery of the tenter frame 1 stretches the screen netting.

The invention can be applied to all uses where a screen netting, for example also made of synthetic material, is required to be releasably joined to a tenter frame in order to give the screen netting an even and exactly adjustable tension.

I claim:

1. A screen printing frame comprising a substantially rectangular outer frame having side and corner parts in adjustable telescopic relation, a substantially rectangular border having a screen netting secured thereto, said corner, side parts and border having complementary cross-sections for releasable attachment of said border to said frame, said corner parts having arcuate section members to which the border is releasably attached, whereby enlargement of the outer frame will stretch the border having the screen netting attached thereto.

2. A screen printing frame according to claim 1, characterized in that the complementary cross section is U-shaped.

3. A screen printing frame according to claim 2, characterized in that said side parts of said frame are arranged on hollow shank members, and said corner parts have guide members rigidy connected thereto, and a screw drive in the hollow shank members and bearing on said guide members.

4. A screen printing frame according to claim 3, characterized in that the corners of the frame have bores serving to fasten the arcuate section members which are provided with pins and have a U-section.

5. A screen printing frame according to claim 4, characterized in that the guide members have scales to measure the adjustment.

6. A screen printing frame according to claim 5, characterized in that the outer frame corners have threaded bores, in which are arranged pins which bear on the shank members during stretching.

References Cited by the Examiner
UNITED STATES PATENTS

| | | | |
|---|---|---|---|
| 2,218,451 | 10/40 | Heyne | 101—415.1 |
| 2,565,218 | 8/51 | Freeborn | 101—415.1 |
| 2,893,162 | 7/59 | Knowles. | |
| 2,925,774 | 2/60 | Scheeler | 101—127.1 |

DAVID KLEIN, *Primary Examiner.*

WILLIAM PENN, *Examiner.*